(12) United States Patent
Millar

(10) Patent No.: US 8,963,736 B2
(45) Date of Patent: Feb. 24, 2015

(54) SYSTEM AND METHOD FOR PORTABLE INSTRUMENTATION

(71) Applicant: ODM Technology Inc., Martintown (CA)

(72) Inventor: Ord Millar, Martintown (CA)

(73) Assignee: ODM Technology Inc., Martintown (CA)

( * ) Notice: Subject to any disclaimer, the term of this patent is extended or adjusted under 35 U.S.C. 154(b) by 130 days.

(21) Appl. No.: 13/858,441

(22) Filed: Apr. 8, 2013

(65) Prior Publication Data

US 2013/0265173 A1 Oct. 10, 2013

Related U.S. Application Data

(60) Provisional application No. 61/621,946, filed on Apr. 9, 2012.

(51) Int. Cl.
| | |
|---|---|
| *G08C 19/22* | (2006.01) |
| *H04Q 9/00* | (2006.01) |
| *G08C 17/02* | (2006.01) |
| *H04W 28/24* | (2009.01) |

(52) U.S. Cl.
CPC .............. *G08C 17/02* (2013.01); *H04W 28/24* (2013.01); *H04Q 9/00* (2013.01); *H04Q 2209/40* (2013.01); *H04Q 2209/823* (2013.01)
USPC .................... 340/870.07; 455/67.7

(58) Field of Classification Search
CPC ................................................... H04W 28/24
USPC ................. 340/870.07; 370/252; 455/67.7
See application file for complete search history.

(56) References Cited

U.S. PATENT DOCUMENTS

| | | |
|---|---|---|
| 6,840,904 B2 | 1/2005 | Goldberg |
| 7,263,459 B2 | 8/2007 | Ito et al. |
| 7,420,663 B2 | 9/2008 | Wang et al. |

(Continued)

OTHER PUBLICATIONS

"Cell Phones Allow Everyone to be a Scientist", Rachael Rettner, Jun. 4, 2009. http://www.livescience.com/3628-cell-phones-scie . . . .
Create the Future Design Contest: Kno-U (Cell phone based sensor), Muthukumaran Venkatachalapathy Villupuram, Tamil Nadu India, Jun. 7, 2010, http://contest.techbriefs.com/medical-2010/473.

(Continued)

*Primary Examiner* — John A Tweel, Jr.
(74) *Attorney, Agent, or Firm* — Victoria Donnelly; IP-MEX Inc.

(57) ABSTRACT

A system and method for portable instrumentation is proposed, comprising a server computer and a portable instrument that is wirelessly connectable to the server computer. The portable instrument comprises sensors for performing respective physical or electrochemical measurements, and a hand-held computer that is operably connectable to the sensors. The hand-held computer is configured to record and transmit the measurements to the server computer. The hand-held computer evaluates a real-time wireless connection quality between the portable instrument and the server computer. When the wireless connection quality shows a declining trend, the hand-held computer determines a spatial boundary where the portable instrument reaches a dead zone with wireless connection quality below a predetermined threshold. The hand-held computer then requests pre-recorded data from the server computer to be forwarded to the portable instrument before the portable instrument reaches the spatial boundary. The efficiency and reliability of the measurements are thus improved.

20 Claims, 11 Drawing Sheets

(56) References Cited

U.S. PATENT DOCUMENTS

| | | |
|---|---|---|
| 7,486,198 B2 | 2/2009 | Van Der Veen et al. |
| 7,960,700 B2 | 6/2011 | Craig et al. |
| 8,040,233 B2 | 10/2011 | Adappa et al. |
| 8,041,389 B2 | 10/2011 | Combs et al. |
| 8,737,930 B2 * | 5/2014 | Sadana .................. 455/67.7 |
| 2006/0247505 A1 | 11/2006 | Siddiqui |
| 2009/0088607 A1 | 4/2009 | Muraca |
| 2010/0169108 A1 | 7/2010 | Karkanias et al. |

OTHER PUBLICATIONS

"Wireless Temperature & Soil Moisture Sensores—HOBOnode", Mar. 7, 2012, http://www.onsetcomp.com/hobonode-wireless-se . . . .

"UCLA engineers create cell phone-based sensor for *E coli* detection", Robin Wulffson, M.D. Feb. 23, 2012, http://www.examiner.com/health-in-los-angeles/uc . . . .

* cited by examiner

SYSTEM AND METHOD FOR PORTABLE INSTRUMENTATION

RELATED APPLICATIONS

The present application claims benefit from the U.S. provisional application Ser. No. 61/621,946 filed on Apr. 9, 2012, entire contents of which are incorporated herein by reference.

FIELD OF INVENTION

The present patent application relates to the field of portable instruments and their method of use.

BACKGROUND OF THE INVENTION

Portable instruments for physical or electrochemical measurements such as pH, oxidation-reduction potential or electrical conductivity are widely used for monitoring industrial processes, quality control, environmental protection, and the like. Such measurements are meaningful only when their corresponding locations, the circumstances and the conditions are known. The conventional methods of capturing the measured information in the field include, for example, using portable instruments and then manually noting resultant readings along with observed details followed by later entering this information into a log book, computer system or other record. Some portable instruments may be equipped with data loggers which electronically record the readings for uploading later to a computer system. Other portable instruments may have ports, which would allow the connection of the instrument to a desktop computer. Some instruments may include connections to allow an external global positioning system unit to be connected for assigning coordinate values to the measurements that are recorded.

However, in spite of the current advancements in the field of portable instrumentation, there is still a need in the industry for the development of improved methods and apparatus for recording and distributing measurements made by portable instruments, to conduct the portable instrumentation more efficiently and reliably.

SUMMARY OF THE INVENTION

It is an object of the present invention to provide an improved method and system for portable instrumentation.

According to a first aspect of the invention, a system for portable instrumentation is proposed. The system comprises:
a server computer;
a portable instrument wirelessly connectable to the server computer, the portable instrument comprising:
one or more sensors for performing respective physical or electrochemical measurements; and
a hand-held computer operably connectable to the sensors and configured to:
(i) record the measurements and transmit the measurements to the server computer;
(ii) evaluate a real-time wireless connection quality between the portable instrument and the server computer; and
(iii) provided the wireless connection quality shows a declining trend:
(iii-1) determine a spatial boundary where the portable instrument reaches a dead zone with the wireless connection quality below a predetermined threshold, and
(iii-2) request pre-recorded data, stored on the server computer and related to the measurements, to be forwarded to the portable instrument from the server computer before the portable instrument reaches the spatial boundary. The features (ii), (iii), (iii-1), (iii-2) are helpful because the user may be in a location where it is not possible to connect with the server computer when the pre-recorded data is needed.

According to an embodiment of the system, the hand-held computer is further configured to predict a location where a measurement in the dead-zone beyond the spatial boundary is going to be performed, and request the server computer to forward the pre-recorded data related to the location before the portable instrument reaches the dead-zone.

According to another embodiment of the system, the hand-held computer is further configured to determine the wireless connection quality as a function of a signal strength at the portable instrument and a signal round trip time between the portable instrument and the server computer.

According to another embodiment of the system, the hand-held computer is further configured to determine a derivate of the wireless connection quality over distance to determine the spatial boundary.

According to another embodiment of the system, the hand-held computer is further configured to:
a) determine how much time it is going to take before the portable instrument reaches the spatial boundary; and
b) determine an amount of data to be sent to the portable instrument within that time, taking into account declining wireless connection quality.

According to another embodiment of the system, the predetermined threshold is selected so as to allow the portable instrument to receive a predetermined amount of data from the server computer.

According to another embodiment of the system, the pre-recorded data is prioritized based on at least one from the following criteria:
cost for data transmission;
amount of data capable to be forwarded to the portable instrument over a wireless connection of declining quality;
a memory size on the hand-held computer;
time stamps of data to be forwarded, with more recent data being given higher priority; and
relevance of said pre-recorded data to the measurements.

According to another embodiment of the system, the hand-held computer is further configured to generate an alert message if the measurements are outside of a range for the pre-recorded data.

According to another embodiment of the system, the system further comprises another portable instrument comprising another hand-held computer that is configured to operate as a server computer when the server computer is unavailable.

According to another embodiment of the system, the measurements comprise at least one of:
global positioning system (GPS) measurement;
compass measurement;
temperature measurement;
pH measurement;
conductivity measurement;
oxidation-reduction potential (ORP) measurement;
video recording; and
audio recording.

According to another embodiment of the system, the pre-recorded data is one or more of the following: audio, video, text and multimedia.

According to a second aspect, the portable instrument is proposed as described in the first aspect and the embodiments thereafter.

According to a third aspect, a method is proposed for portable instrumentation performed by a portable instrument wirelessly connectable to a server computer, and having one or more sensors for performing physical or electrochemical measurements and a hand-held computer operably connectable to the sensors, the method comprising the steps of:

(i) recording the measurements and transmitting the measurements to the server computer;

(ii) evaluating a real-time wireless connection quality between the portable instrument and the server computer;

(iii) provided the wireless connection quality shows a declining trend:

(iii-1) determining a spatial boundary where the portable instrument reaches a dead zone with wireless connection quality below a predetermined threshold; and (iii-2) requesting pre-recorded data, stored on the server computer and related to the measurements, to be forwarded to the portable instrument from the server computer before the portable instrument reaches the spatial boundary.

According to another embodiment the method further comprises the step of predicting a location where a measurement in the dead-zone beyond the spatial boundary is going to be performed, and requesting the server computer to forward the pre-recorded data related to said location before the portable instrument reaches the spatial boundary.

According to another embodiment of the method:
the step (ii) comprises determining the wireless connection quality as a function of a signal strength at the portable instrument and a signal round trip time between the portable instrument and the server computer; and
the step (iii-1) comprises determining a derivate of the wireless connection quality over distance to determine the spatial boundary.

According to another embodiment, the method further comprises the step of:
determining how much time it is going to take before the portable instrument reaches the spatial boundary; and
determining an amount of data to be sent to the portable instrument within said time, taking into account declining wireless connection quality.

According to another embodiment, the method further comprises the step of:
determining the predetermined threshold so as to allow the portable instrument to receive a predetermined amount of data from the server computer.

According to another embodiment, the method further comprises the step of prioritizing the pre-recorded data based on the criteria as described under an embodiment of the first aspect.

According to another embodiment of the method, the measurements comprise at least one of the measurements as described under an embodiment of the first aspect. The pre-recorded data is one or more of the following: audio; video; text; multimedia.

Thus, an improved system and methods for recording and distributing measurements made by portable instruments have been provided.

The present invention provides an improved system and method for recording and distributing measurements made by portable instruments along with observations, to serve as reference guidelines for real-time measurements with portable instruments. In particular, the proposed system and method relate to physical and electrochemical measurements, along with the support of audio recording, video recording, still photography, measurements with the global positioning system and the like. The system and method improves the reliability and efficiency of the real-time measurements. The measurements may be made for analyzing quality of a water body or soil or any other investigative site.

The forgoing summarizes the principal features of the invention and some of the optional embodiments. The invention may be further understood by the description of the preferred embodiments, in conjunction with the drawings, which now follow.

BRIEF DESCRIPTION OF THE DRAWINGS

Embodiments of the invention will now be described, by way of example, with reference to the accompanying drawings in which.

DESCRIPTION OF EMBODIMENTS OF THE INVENTION

Figure 1:
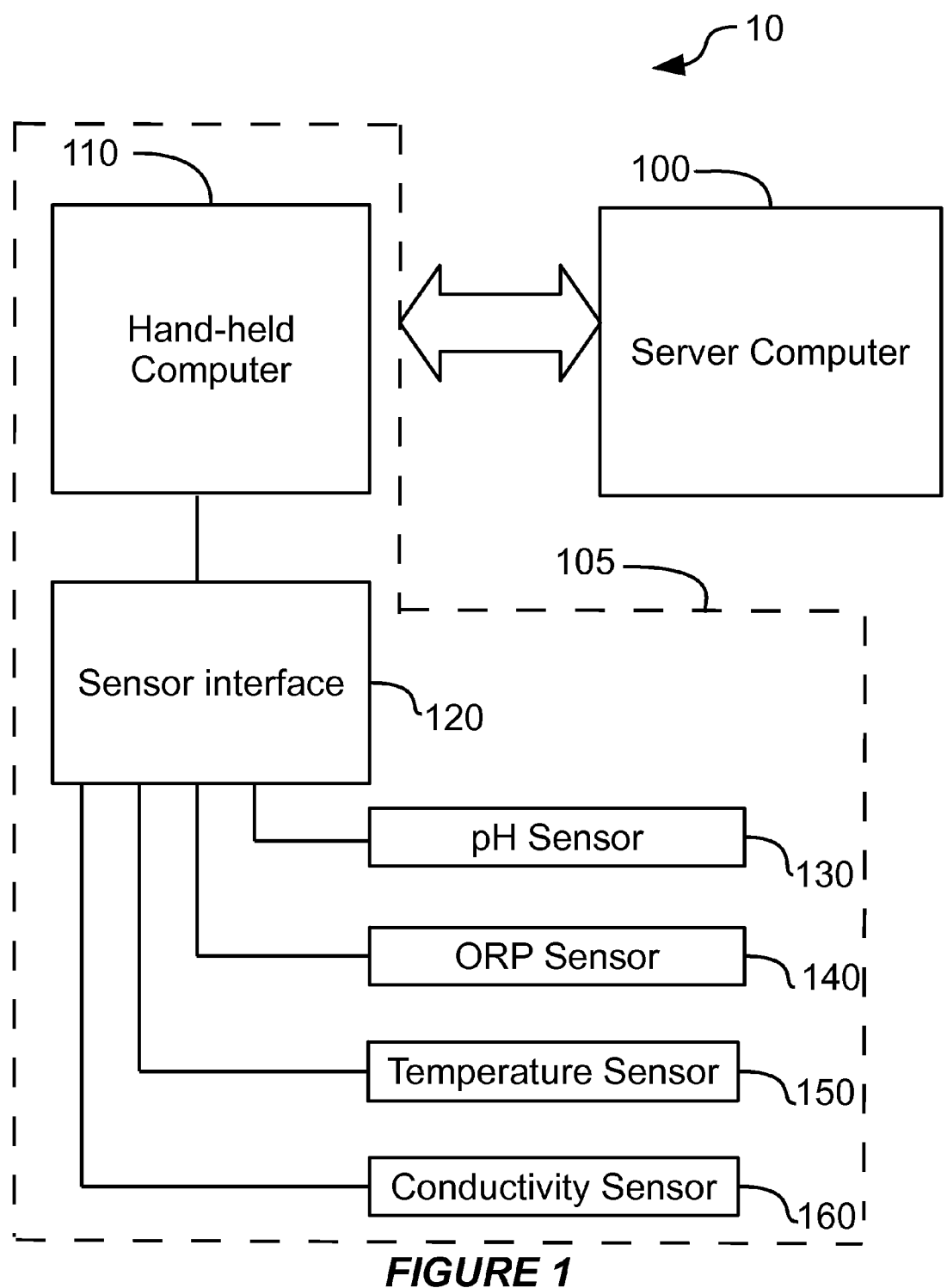
FIG. 1 illustrates the proposed system according to an embodiment of the present invention.

FIG. 1 illustrates an embodiment of the system 10 as proposed under the present invention for portable instrumentation. The system 10 is shown to include a server computer 100 and at least one portable instrument 105 that is wirelessly connectable to the server computer 100. The portable instrument 105 comprises a hand-held computer 110 and sensors 130, 140, 150, 160 for performing respective physical or electrochemical measurements. The hand-held computer 110 is connected to the sensors 130, 140, 150, 160. The hand-held computer 110 is configured to record the measurements and transmit the measurements to the server computer 100. The system 10 is shown to include the pH sensor 130, an oxidation-reduction potential (ORP) sensor 140, a temperature sensor 150 and a conductivity sensor 160. Other types of sensors may also be used (not shown). The sensor interface 120 shown is an electronic circuit that is installed between the sensors 130, 140, 150, 160 and the hand-held computer 110. In other embodiments of the invention, the sensor interface 120 may be integrated into either the sensors 130, 140, 150, 160 or into the hand-held computer 110. The hand-held computer 110 may be a smart-phone or a tablet computer or a laptop computer or any another hand-held computing device comprising a display, port for inputting sensors, processor, memory and system connection capabilities. During operation of the system 10, one or more sensors 130, 140, 150, 160 sense properties of the medium to be measured and generate signals which are amplified, conditioned and converted to digital signals by the sensor interface 120. When commanded by the hand-held computer 110, the sensor interface 120 sends the digital signals to the hand-held computer 110, which performs further processing on the digital signals to convert the digital signals into measured values. The sensors 130, 140, 150, 160, the sensor interface 120 and the hand-held computer 110 may or may not be integrated into one piece to form the portable instrument 105.

Figure 2:
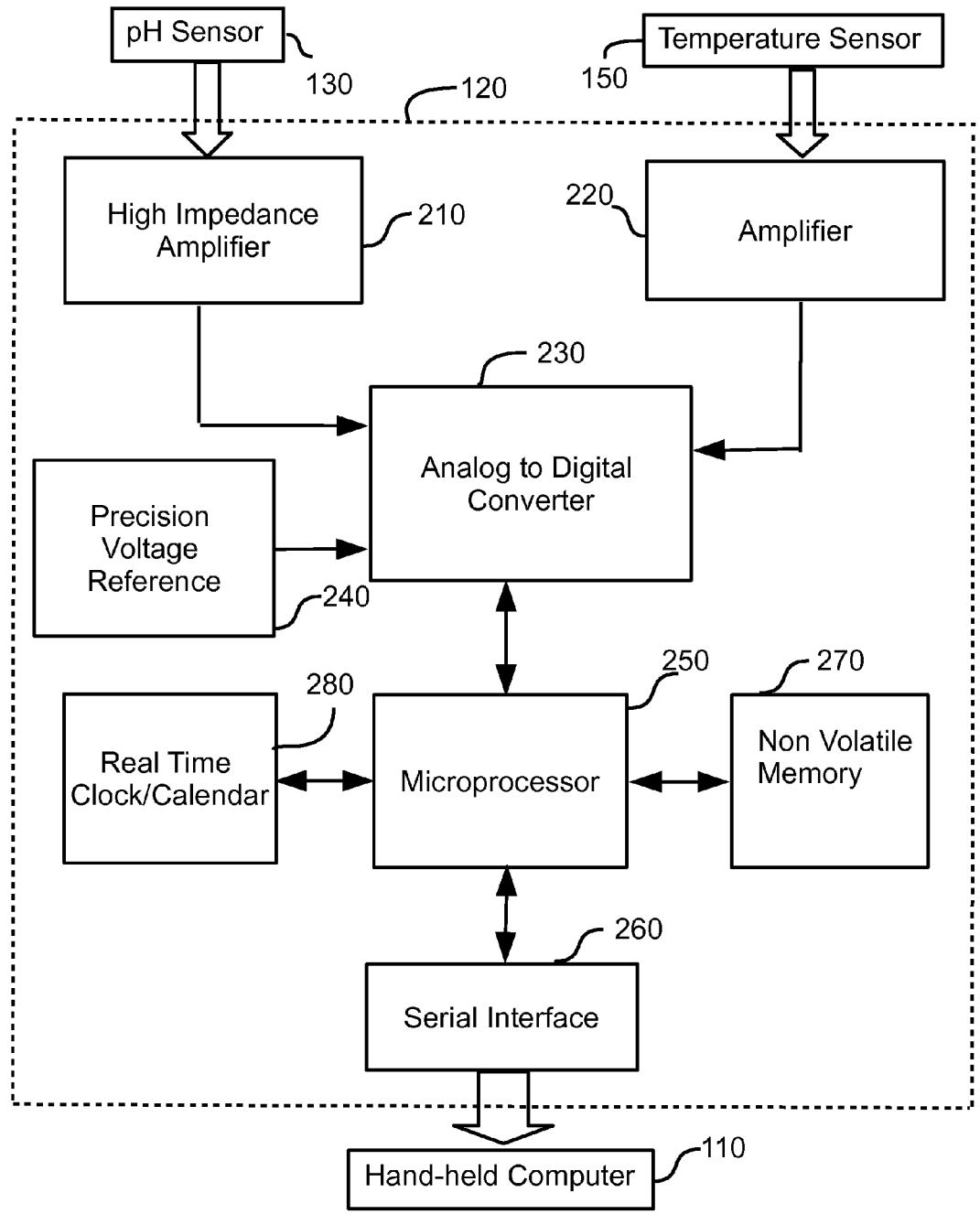
FIG. 2 illustrates a block diagram of the sensor interface shown in FIG. 1 and according to an embodiment of the invention.

FIG. 2 shows a block diagram of the sensor interface 120 according to an embodiment of the invention. For simplicity, FIG. 2 illustrates only the pH sensor 130 and the temperature sensor 150. The analog signals received from the sensors 130 and 150 are amplified and conditioned by respective amplifier modules 210, 220 and then sent to an analog to digital converter module 230. It may be appreciated that any number of such sensors can be connected, each with an appropriate amplifier. A precision voltage reference module 240 generates a known stable voltage for comparison. The microprocessor module 250 communicates with the hand-held computer 110 through a serial interface module 260, which may be wired or wireless. The serial interface 260 may be any of RS-232, USB, WiFi, Bluetooth or other means of digital communication between the microprocessor module 250 and the hand-held computer 110. Upon receiving a measurement command from the hand-held computer 110, the microprocessor module 250 triggers the analog to digital converter module 230 to acquire readings from the attached sensors 130 and 150. The microprocessor module 250 waits for the conversions to be completed and then transmits the digital signals through the serial interface module 260 to the hand-held computer 110. Conveniently, the microprocessor module 250 may be programmed to trigger the analog to digital converter module 230 to record readings at intervals, determined by the attached real time clock or calendar module 280 and store the resulting readings in the non-volatile memory module 270. The sensor interface module 120 may record measurements without connection to the hand-held computer 110. Once the hand-held computer 110 is connected to the sensor interface module 120, the accumulated readings can be read from the non-volatile memory module 270 and transmitted through the serial interface module 260 to the hand-held computer 110. In some embodiments, several of the above-noted modules are integrated together with the microprocessor module 250. Several commonly available microprocessors include the analog to digital converter, real-time clock or calendar, non-volatile memory, serial interface, and precision voltage reference function in a single microchip. It is understood that the function of the embodiments of the invention is not affected if these components are integrated with the microprocessor module 250.

Figure 3:
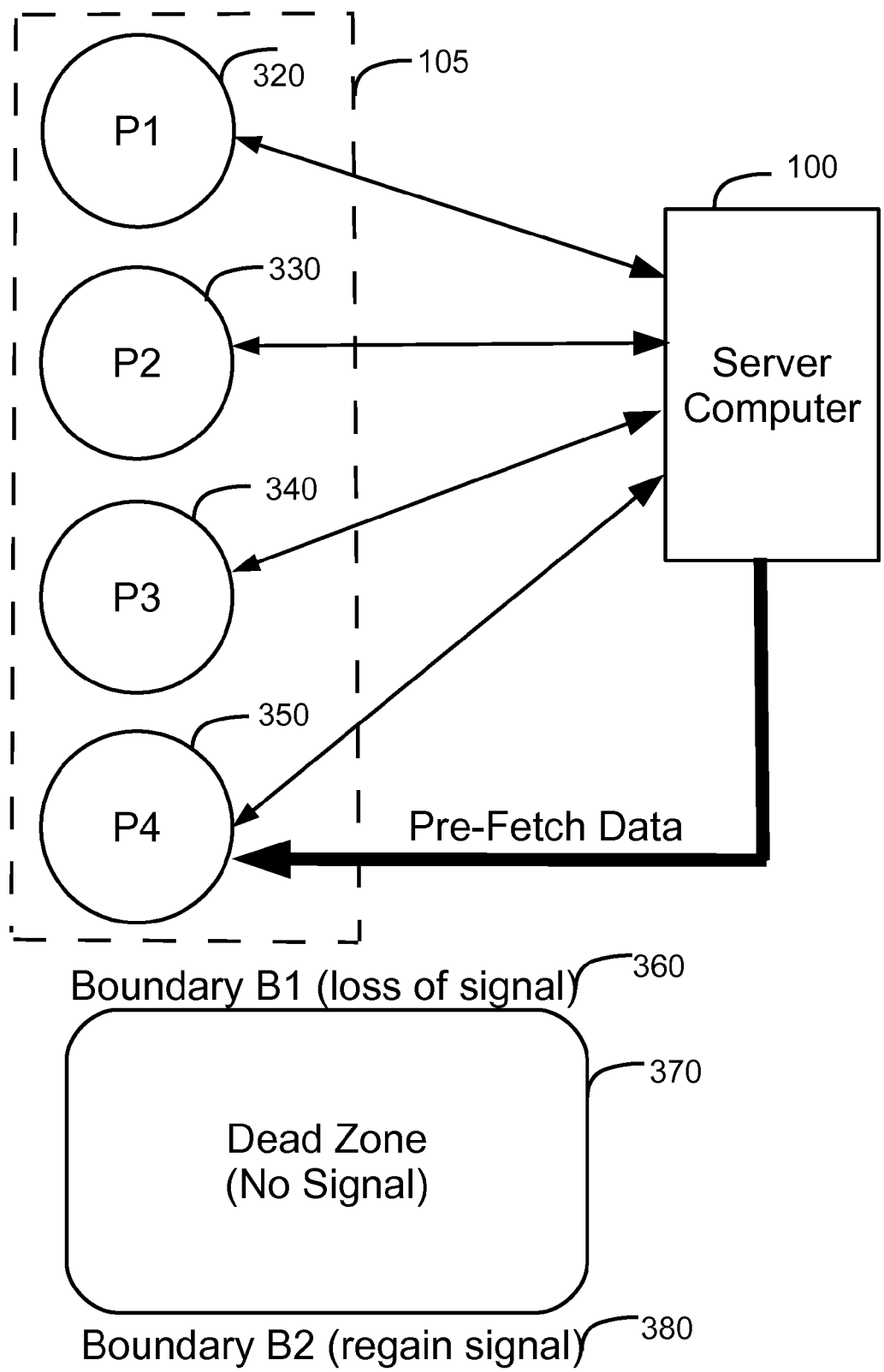
FIG. 3 illustrates the pre-fetching concept embedded in the system at FIG. 1 and according to an embodiment of the present invention.

FIG. 3 describes an embodiment of the invention related to pre-fetching data from the server computer 100, where the hand-held computer 110 also evaluates the real-time wireless connection quality between the portable instrument 105 and the server computer 100. If the wireless connection quality shows a declining trend, the portable instrument 105 determines a spatial boundary B1 360 where the portable instrument 105 reaches a dead zone 370 with wireless connection quality below a predetermined threshold. The portable instrument 105 then requests pre-recorded data, stored on the server computer 100 and related to the measurements to be forwarded to the portable instrument 105 from the server computer 100 before the portable instrument 105 reaches the spatial boundary B1 360. In this example, a user travels through points P1 320, P2 330, P3 340 and P4 350. At each point, a test message is sent to the server computer 110 to measure transfer rates and signal strength. The signal continues to decline as point P4 350 is reached and the hand-held computer 110 calculates that it would use at least half of the remaining transmission capacity to retrieve the pre-recorded data for the dead zone 370 before the spatial boundary B1 360 is reached. Therefore, the hand-held computer 110 sends a pre-fetch request to the server computer 100, which delivers as many records as possible before the user loses the signal completely in the dead zone 370. At the boundary B2 380, the signal is regained, thereby limiting the dead zone 370 to within the boundaries B1 360 and B2 380. The hand-held computer 100 may be configured to predict a location where a measurement in the dead-zone 370 beyond the spatial boundary B1 360 is going to be performed, and request the server computer 100 to forward the pre-recorded data related to that location before the portable instrument 105 reaches the dead-zone 370. Similar procedure may be used when the hand-held computer 110 contains data that is required by the server 100 for processing or distribution to other users. In this case, the boundary detection is used to trigger the transmission of the measurement records from the hand-held computer 110 for pre-loading to the server computer 100 before the spatial boundary B1 360 is reached. The decision to transmit from the hand-held computer 110 to the server 100 for pre-loading may be based on the positions and directions of travel of other users of the system 10. In the case where other users are likely to reach a point for which there are measurement records on the hand-held computer 110, it is advantageous to send those measurement records prior to the loss of the signal. To minimize unnecessary data traffic in the case where the user changes direction or stops before the signal boundary B1 360, it is helpful to have the system 10 wait as long as possible before pre-fetching or pre-loading the data.

Figure 4:
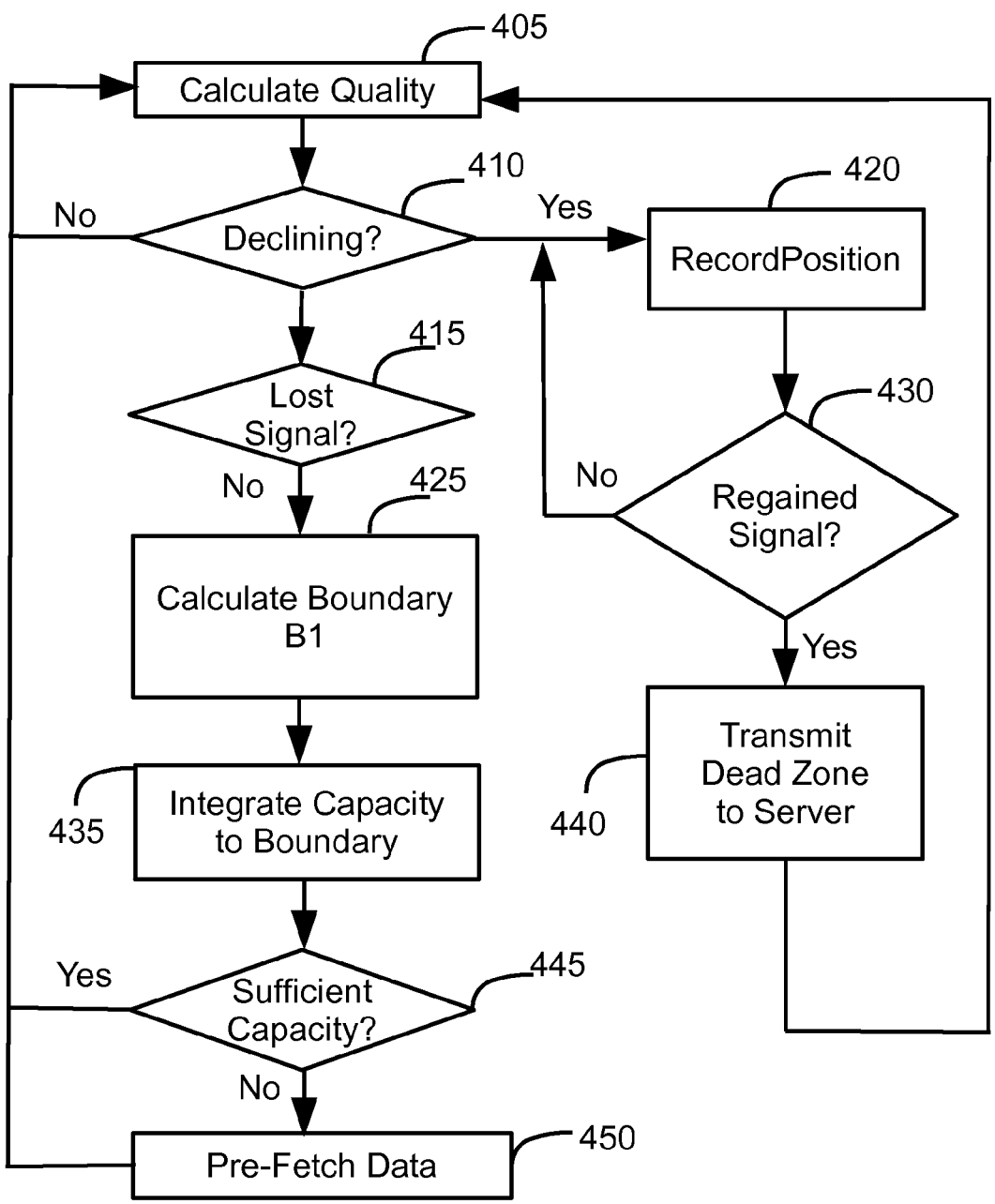
FIG. 4 illustrates the steps related to the pre-fetching concept at FIG. 3 and according to an embodiment of the invention.

FIG. 4 illustrates calculating a wireless connection quality (Q) between the hand-held computer 110 and the server computer 100, for the processes of pre-fetching and pre-loading data from the server computer 100. The hand-held computer 110 may be configured to determine the value of Q as a function of a signal strength at the portable instrument 105 and a signal round trip time between the portable instrument 105 and the server computer 100. The value of Q may be calculated, for example, as follows:

$$Q=[\text{Success\_Rate}*\text{Signal\_Strength}]/[\text{Signal\_Round\_Trip\_Time}]$$

where Success_Rate is the ratio of the test messages received by the server computer 100 to the test messages sent by the hand-held computer 110, Signal_Round_Trip_Time in seconds is the time taken by the test message to reach the server computer 100 and return to the hand-held computer 110, and Signal_Strength is an indicator from 0 to 1, representing the strength of the signal carrying the test message. Other methods of measuring the wireless connection quality Q may also be useful.

In the case where there is no previous history to show the dimensions of the dead zone 370, the server computer 100 and the hand-held computer 110 may negotiate the size of the pre-recorded data to be forwarded. In doing so, the system 10 may calculate the number of measurements that can be taken in a standard time period and limit the forwarding of the pre-recorded data to that. For example, it may be considered that the standard data collection time is limited to 4 hours, and knowing that the collection rate is 10 samples per hour, the server computer 100 and the hand-held computer 110 may negotiate a total pre-recorded data for the 40 most likely records. In practice, the requested pre-recorded data will always be larger, and to account for uncertainty in the locations the user may select. Typically a multiple of 2 or 3 is used, so in this example 80 or 120 pre-recorded data would be sent. The hand-held computer 110 may be configured to determine a derivate of the wireless connection quality over distance to determine the spatial boundary B1 360. The predetermined threshold may be selected so as to allow the portable instrument 105 to receive a predetermined amount of data from the server computer 100. The pre-recorded data is prioritized based on criteria such as the cost for data transmission, the amount of data capable to be transmitted to the portable instrument 105 over a wireless connection of declining quality, the memory size on the hand-held computer 110, the time stamps of data to be transmitted with more recent data being given higher priority and relevance of the pre-recorded data to the measurements. The server computer 100 attempts to provide the most relevant pre-recorded data by considering the proximity of the recorded points to the user's path of travel, the time required for the user to reach the point, the number of previous recordings taken at that point, the relative dispersion of values at that point and the availability of meta data for those measurements. These factors become the coefficients in a weighting algorithm to select the order or the pre-recorded data to transmit.

For example, one such weighting algorithm is:

$$WA = N*V/(D*T)*M$$

Where:
WA is the calculated weighting algorithm of this pre-recorded data;
N is the number of previous readings at the point;
V is the variation in readings at that point;
D is the distance of the point from the user's current path;
T is the time to reach the point at the user's current speed; and
M is the number of records which have additional meta data.

The server computer 100 selects the pre-recorded data to be sent in order determined by WA. Knowing that records with certain types of meta data such as photographs are more important to the user, the WA may be adjusted.

The types of the measurements may be global positioning system (GPS) measurement, compass measurement, temperature measurement, pH measurement, conductivity measurement, oxidation-reduction potential (ORP) measurement, video recording, audio recording and the like. The pre-recorded data may be audio, video, text, and multimedia or combinations thereof.

The pre-fetching algorithm in the calculate quality module 405 is run periodically. Each time the connection quality is calculated, the hand-held computer 110 records the Q value with the time and location of the hand-held computer 110. If the declining module 410 assesses that there is no decline in the signal quality, the function loops back to the calculate quality module 405. If the declining module 410 assesses that there is decline in the signal quality and finally the signal is lost as shown by the lost signal module 415, this location is recorded as shown by the record position module 420. Until the signal is regained as shown by the regained signal module 430, the lost signal location is recorded in the record position module 420. Each time the hand-held computer 110 detects a point with zero connectivity, the location is recorded as in the record position module 420. Once the signal is regained, the hand-held computer 110 will transmit to the server computer 100 the locations of all points with no signal, as shown by the transmit dead zone to server module 440. The server computer 100 adds these points to a dead zone table (not shown), which is used in future calculations. Once the signal is regained, the function again loops back to the calculate quality module 405. If the declining module 410 shows the signal declining, but not lost as in the lost signal module 415, the boundary B1 360 where the signal would be lost is calculated as shown by the calculate boundary B1 module 425. As shown by the integrate capacity to boundary module 435, the capacity for transmitting and receiving the data by the portable instrument 105 is evaluated. If sufficient capacity is available even with the declining signal strength as shown by the sufficient capacity module 445, the function loops back to the calculate quality module 405. The hand-held computer 110 compares the available bandwidth to the amount of related pre-recorded data on the server computer 100 for the area past the spatial boundary B1 360. If the available bandwidth is well in excess of the total pre-recorded data that could be sent, no action is required. However, if the sufficient capacity module 445 detects insufficient capacity, the pre-fetch data module 450 is activated for forwarding the pre-recorded data from the server computer 100 to the hand-held computer 110. Herefrom, the function again loops back to the calculate quality module 405. If the connection quality as in the calculate quality module 405 is decreasing, an evaluation is made of the position at which the connection will be lost. The hand-held computer 110 communicates this estimated position spatial boundary B1 360 to the server computer 100. At the server computer 100, this information is compared with inputs from other hand-held computers 110 which are or were in the vicinity, by calculating the signal drop vectors for every other pair of points. These are added to the list of points that form the signal loss boundary to increase the definition. Optionally the hand-held computer 110 may send its location to the server computer 100 and the server computer 100 will look up a table of known boundaries B1 360 or dead zones 370 from the past and in the vicinity of the hand-held computer 110 and advise the user accordingly. Each time a hand-held computer 110 passes through a dead zone 370, it sends a list of all known positions without signal to the server computer 100 for updating the tables. This historic information is used in preference to the real-time calculations, except in the case where the real-time calculation shows that the dead zone boundary B1 360 may be closer than the known dead zone 370 stored in the server computer 100. The hand-held computer 110 may be configured to determine how much time it is going to take before the portable instrument 105 reaches the spatial boundary B1 360, and to determine an amount of data to be sent to the portable instrument 105 within said time, taking into account declining wireless connection quality. This is executed by the integrate capacity to boundary module 435, based on the user's speed and direction. Optionally, where the server computer 100 has dead zone records defining the extents of the area without signal, the available pre-recorded data may be calculated to be only those falling within the defined geometry of the dead zone 370. In the case that the available transfer capacity is less than the volume of data available, the hand-held computer 110 may request a reduced data set. The volume of data transmitted may be reduced by such methods as cutting the resolution of images and video files.

The predetermined threshold may be selectable so that to allow the portable instrument 105 to receive a predetermined amount of data from the server computer 100. The system 10 in real-time may identify and optimize measurement locations for obtaining the physical or electrochemical measurements, by computing the gradient of the measurement records between selected locations. More measurement locations may be identified between the selected locations if the gradients are steeper than a predetermined gradient value, to determine the linearity or non-linearity of the measurement records. Similarly if the gradients between the pairs of the selected locations are in random order, more measurements may be required in between the selected locations to determine further details on the patterns between them.

The hand-held computer 110 in real-time updates the respective user with the locations and times of the related pre-recorded data available in the server computer 100 for avoiding repetitive measurements, unless the user decides otherwise.

Extrapolation or interpolation of said pre-recorded data may also be used in the server computer 100 for modeling and computing danger levels and alerting the users by the hand-held computers 110, for action.

The capabilities of the server computer 100 may be embedded into the hand-held computers 110 themselves. Thus any user's hand-held computer 110 may act as the server computer 100 for any other user's hand-held computer 110. This feature is useful, for example, in cases where two or more users are in a remote location without access to a central server computer 100. The user's hand-held computers 110 may then exchange readings, and transfer those readings to other users who come in the range or to a central server computer 100 when one becomes available. Such hand-held computer 110 may then notify the others within range that it has transmitted the data on their behalf, so that redundant communication is eliminated.

Figure 5:
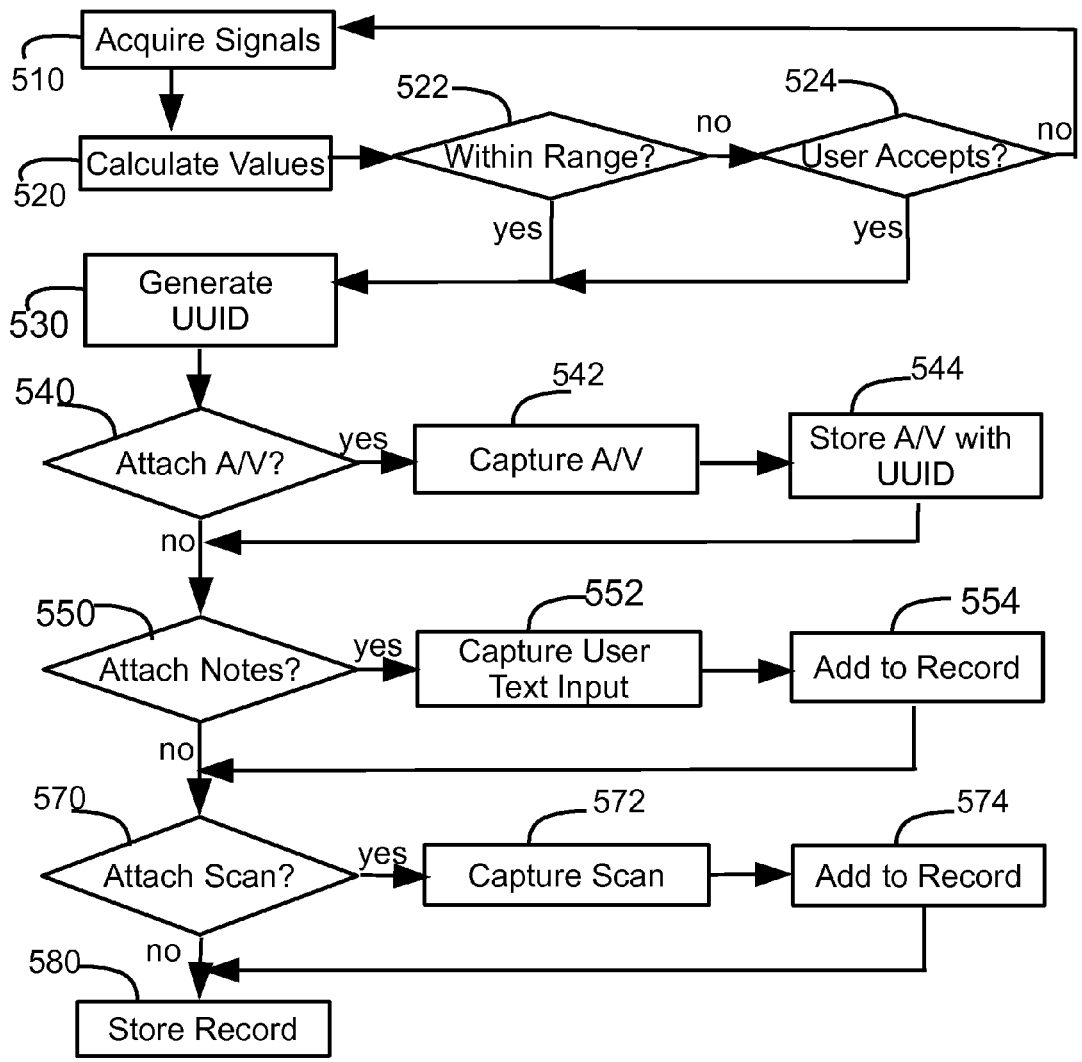
FIG. 5 shows a flowchart illustrating steps performed for obtaining a new measurement by the portable instrument and according to an embodiment of the invention.

FIG. 5 shows a sequence of the method steps according to an embodiment, for obtaining measurements by the hand-held computer 110. The hand-held computer 110 acquires signals from the sensor interface 120 by executing the acquire signals module 510 that commands the sensor interface 120 to respond with digital representations of the signals at the sensors 130, 140, 150, 160.

These values are stored in a newly created measurement record, with other variables known to the hand-held computer 110 such as latitude, longitude, current user, serial numbers, and the like. Next, the calculate values module 520 is run, converting the signal values into measured values, by performing a mathematical calculation. The calculations used to convert the electrical signal values into measured values are well established and generally published by the manufacturers of the sensors. In some embodiments, within range module 522 is executed, which compares the measured values with the pre-recorded data of the server computer 100 and taken at the same location or under similar circumstances. By comparing with the average and standard deviations of the pre-recorded data, the probability that the current measurement is out of range is determined. If the measurements are outside of a range for pre-recorded data, the hand-held computer 110 is further configured to generate an alert message (not shown) for the user and asked to confirm and accept the measurement at the user accepts module 524. Because of limited capacity in the hand-held computer 110, not all the related pre-recorded data will be contained. In such a case, the hand-held computer 110 will send a message to the server computer 100, indicating the time, location and value of the measurement taken. The server computer 100 then executes an algorithm to determine which readings should be used for the comparison. The server computer 100 may use a database of geographical information to determine if the position is contained within a closed polygon that defines a measurement body. Where the reading position lies within such a body, other measurements taken in the same body are given increased weights than the anomalous readings. In this system, the measurement body database is maintained on the server computer 100 which defines the boundaries of such bodies as a list of coordinate points. Each time a measurement is sent for verification, the measurement body database is searched to determine if this point lies within the boundaries of a previously measured body. If this measurement point is within the previously measured body of water, a weighted average is calculated where the weights are determined by the inverse of the distance those points are from the current point. The maximum and minimum values of each previous measurement are also calculated. The alert message is on the display of the hand-held computer 110 when the value is outside the normal ranges. Thus the user can be alerted to a possible bad reading even if that user has never taken a measurement previously in that location. If the reading is accepted by the within range module 522 and the user accepts module 524, the generate UUID module 530 creates an identification number for this measurement, which is unique across all the portable instruments 105 and all measurements under the system 10. Thus, measurement records generated by different portable instruments 105 can be safely combined in a single database, without a risk of duplicating the identification numbers. The identification number may be generated in accordance with the international standard termed as 'generation and registration of universally unique identifiers (UUIDs) and their use as ASN.1 Object Identifier components. Other methods may also be used which assure virtually zero chance of collision. This UUID is stored in the measurement record. Based on the capabilities of the hand-held computer 110 and the user input, the attach A/V module 540 decides whether or not one or more audio/visual files need to be attached to the measurement record, such files being such as digital photographs, video records, audio records, or any other files. If audio/visual files are needed, the capture A/V module 542 is executed as many times as required to capture an audio/visual file such as from an embedded camera and/or microphone in the hand-held computer 110, followed by executing the store A/V with UUID module 544 to store the captured files indexed by the measurement record's UUID to the local storage. Based on the user input, the attach notes module 550 decides whether or not the user's notes need to be added to the measurement record. If the user's notes are required, the capture user text input module 552 is executed to capture input from a keypad, touch screen or any other input device. The user text may include several fields for notes, descriptions, location, observations or other data as required by the specific application. The add to record module 554 adds all the captured notes to the measurement record in the local storage. Based on the capabilities of the hand-held computer 110 and the user's notes, the attach scan module 570 decides whether or not scans of one or more bar code, quick response QR code or radio frequency identification RFID code need to be attached to the measurement record. If one or more scans are needed, the capture scan module 572 is executed, which will use either a camera of the hand-held computer 110 or an integrated bar code reader or RFID reader to scan a code, followed by the add to record module 574 to add the captured scan data to the measurement record. Some embodiments of the invention may allow more than one scanned code to be attached to the measurement record. The store record module 580 is called to complete the process of recording the measurements to the local storage on the hand-held computer 110.

Figure 6:
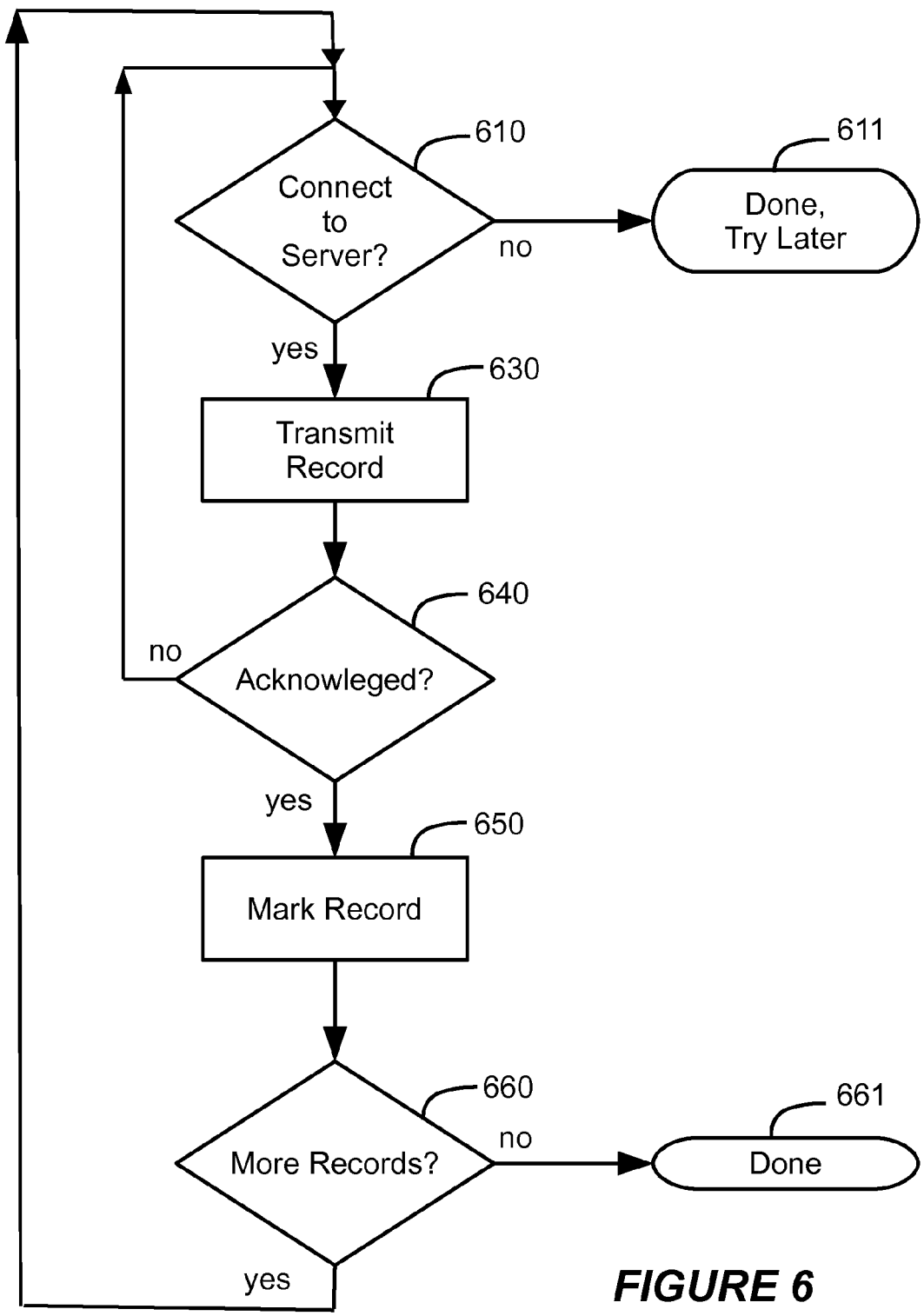
FIG. 6 shows a flowchart illustrating steps performed for transmitting the measurement records from a hand-held computer to the server, according to an embodiment of the invention.

Referring to FIG. 6, a sequence of steps is shown illustrating the transmittance of measurement records that have been captured by the hand-held computer 110 and saved in a local storage. First the connect to server module 610 determines if a system connection can be established to the server computer 100. If no connection is available, the try later module 611 is executed. Once a connection to the server computer 100 has been established, the transmit record module 630 is executed, sending one measurement record to the server computer 100. If the connection method is high bandwidth and low cost, the supporting audio and digital files are included in their entirety. If the connection bandwidth is low or the connection method is high cost such as over a cellular system, then reduced resolution versions may be sent. The acknowledged module 640 examines the response from the server computer 100 to determine if the measurement record was successfully received and stored. If not, the process loops back to retry the connect to the sever module 610. If the measurement record was successfully stored in the server computer 100, the hand-held computer 110 is updated by the mark record module 650 to indicate this, so that it will not resend. The more records module 660 examines the contents of the local storage on the hand-held computer 110 to determine if there are any more measurement records that need to be transmitted to the server computer 100. If there are more measurement records, with the 'yes' command the process loops back to the beginning to the connect to server module 610. If there are no measurement records that need to be sent to the server computer 100 with a 'no' command from more record module 660, the process ends at module 661.

Figure 7:
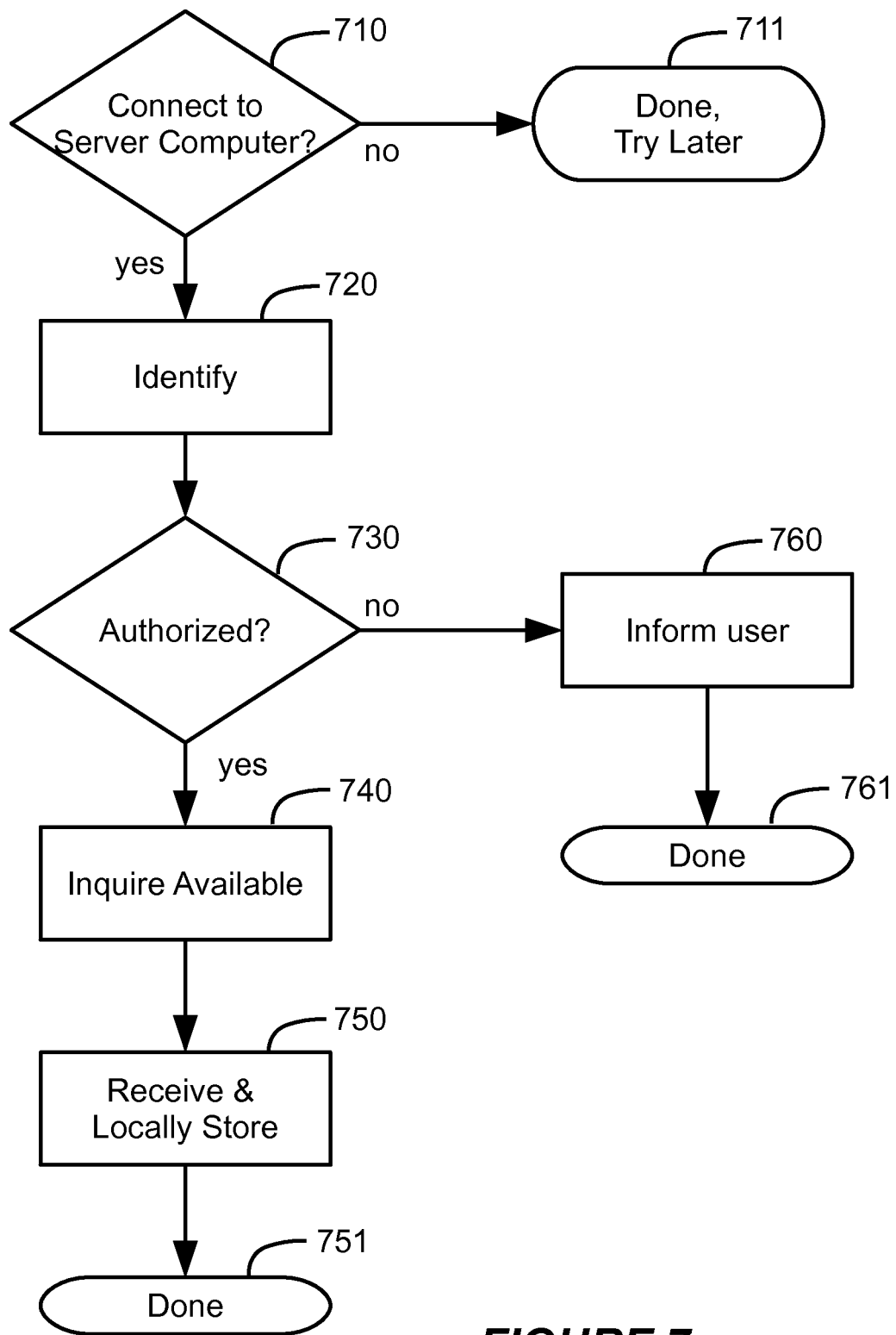
FIG. 7 shows a flowchart illustrating steps performed for requesting for pre-recorded data from the server computer, according to an embodiment of the invention.

Referring to FIG. 7, a sequence of steps is shown illustrating the retrieval of the pre-recorded data from the server computer 100 by the hand-held computer 110. The hand-held computer 110 executes the connect to server module 710. The hand-held computer 110 notes the type and speed of the connection available and stores this information in a memory for later decisions. If the connection is not available, the procedure is terminated at module 711 for attempting to connect again at a later time. Once a connection has been established, the identify module 720 is executed. The hand-held computer 110 exchanges authentication information with the server computer 100, such as a user name and password combination. The server computer 100 determines by lookup into an authorized user table whether or not this user is entitled to access the server computer 100. Based on the response from the server computer 100, the authorized module 730 is executed. If the user credentials are not valid, the inform user module 760 is executed to display a message to the user in his hand-held computer 110, explaining the reason for denial of access and the procedure is terminated at module 761. When the authorized module 730 in the server computer 100 determines that the user is entitled to access the server computer 100, the inquire available module 740 is run in the server computer 100. An inquiry message is sent to the server computer 100 from the hand-held computer 110, requesting the number and type of the pre-recorded data in the server computer 100 that are available to this user. The server computer 100 determines the available pre-recorded data based on the group membership of the current user and responds with an indication of the numbers available, the date ranges, measurement types, geographies included and the like. The receive and locally store module 750 sends requests to the server computer 100, for all measurement records that the hand-held computer 110 can store locally. The function then ends at the done module 751. The number and order of the requests for the pre-recorded data are based on the connection speed as determined when the connection was established, the capacity of the storage on the hand-held computer 110 and preferences as set by the user. The retrieval process may start with the most recent record with coordinates at or near the user's current location, followed by the corresponding older records. Thereafter, the retrieval process may be followed by recent records from more distant locations followed by the corresponding older records. To allow the user to review relevant records among the many pre-recorded data, a method of yet another embodiment of the invention may be used to detect the user's manner of measurement and automatically suggest the relevant pre-recorded data. The time intervals of previous measurements at this location may be considered to detect patterns. If the current time and date falls within the error margins of the next measurement time according to the time interval pattern, the display may show the user the most recent regularly scheduled readings at this location, with the time intervals displayed. Next, the geographic position may be considered. If the most recent measurements taken follow a curve at regular distances, the algorithm may determine that the user is currently taking samples at regular geographic spacing and show the distance and direction from previous measuring locations. The method monitors the positional changes from the GPS integrated in the hand-held computer 110. When the user comes within a defined distance of a previously measured point and the type of sensor connected to the interface is the same as the one previously used, a screen window is opened on the hand-held computer 100 to show the user the notes or photographs taken the last time another user measured with a similar sensor at this location. Alternatively, in many cases, there may be such a quantity of users and measurements that it is necessary to limit the data that is sent to each user. Therefore, an algorithm needs to be used within the server computer 100 and/or the hand-held computer 110 to determine which readings should be sent to each user.

Figure 8:
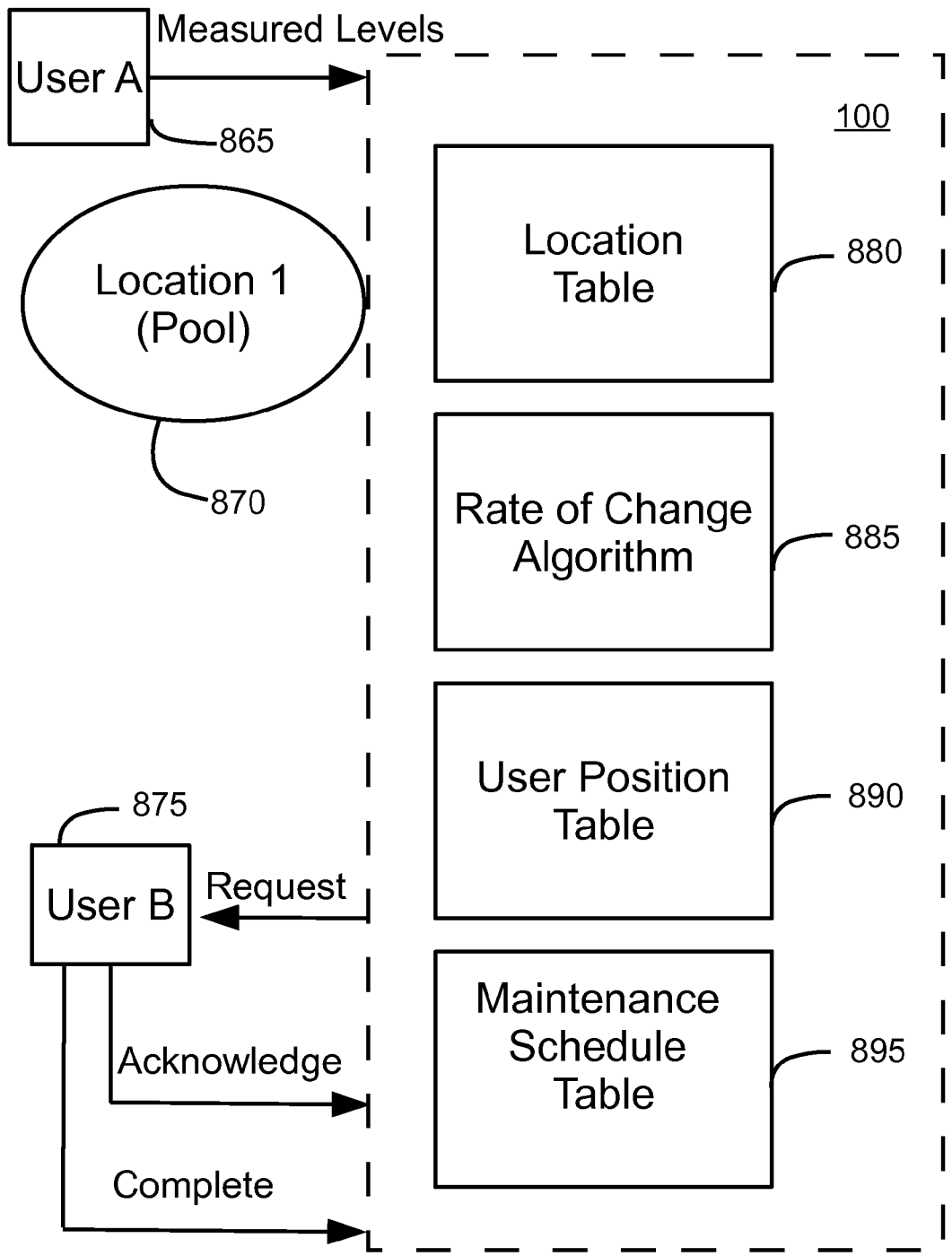
FIG. 8 illustrates an embodiment of the invention for obtaining, sharing and prioritizing measurements between multiple portable instruments.

FIG. 8 illustrates an embodiment of the invention for obtaining, sharing and prioritizing measurements between multiple portable instruments. Herein, once a measurement record has been stored at the server computer 100 by a hand-held computer 110, the server computer 100 determines if other users of the system 10 have an immediate need to know the results of this current measurement. If so, the server computer 100 will transmit messages to the hand-held computers 110 of the other users, advising them that a new measurement record is available on the server computer 100. In this example, users are measuring the chlorine levels of public swimming pools and the information is relayed through the server computer 100 to the users like operators of the chlorine delivery vehicles. In this example for simplicity only the current level of chlorine is considered along with the rate of change since the last measurement. A priority is established based on the amount of time it is expected to take before the levels fall outside of the safe range. The algorithm then determines which locations will be the first to get out of the safe operating range. Knowing the positions of the users, their travel rate and operating hours, potential routes are calculated which will result in the required chemicals being delivered before the levels get out of range. Additionally, other parameters may be considered in calculating the priority of deliveries: air temperature, water temperature, historic rates of consumption at this location and other parameters which have been correlated to the rate of change.

Example

User A 865 has taken a chlorine measurement at a geographic coordinate location 1 870. Upon transmission of this measurement record to the server computer 100, the server computer 100 looks up a geographic database location table 880 and determines that location 1 870 is a swimming pool maintained by company Y. By executing the rate of change algorithm 885, the server computer 100 decides that the chlorine level at location 1 870 will drop to an unsafe level before the next scheduled maintenance. A lookup is performed on a user position table 890 of the current user positions and the server computer 100 determines that User B 875 is the closest available employee of company Y to location 1 870 that has the capability of delivering the required chemicals. The server computer 100 sends a message to user B 875, requesting delivery of the calculated quantity of chemical to location 1 870. User B has a sufficient quantity of the required chemical and can make the delivery, hence replies to the server computer 100 acknowledging that the delivery will be made. The server computer 100 adds this pending delivery to the maintenance schedule table 895. At some time later, user B 875 has delivered the required quantity of the chemical to the pool at location 1 870. User B 875 now sends a 'complete' message to the server computer 100. The server computer 100 updates the maintenance schedule table 895 to show that the delivery has been made. The hand-held computer 110 may also retrieve the associated audio/visual files with each pre-recorded data, the decision being based on the current connection bandwidth and cost. The received pre-recorded data may be displayed to the user on the hand-held computer 110, in the form of a map, table or chart. If the audio/visual files have been retrieved from the server computer 100, these may be displayed to the user of the hand-held computer 110. The retrieval process continues until all identified pre-recorded data have been received from the server computer 100.

Figure 9:
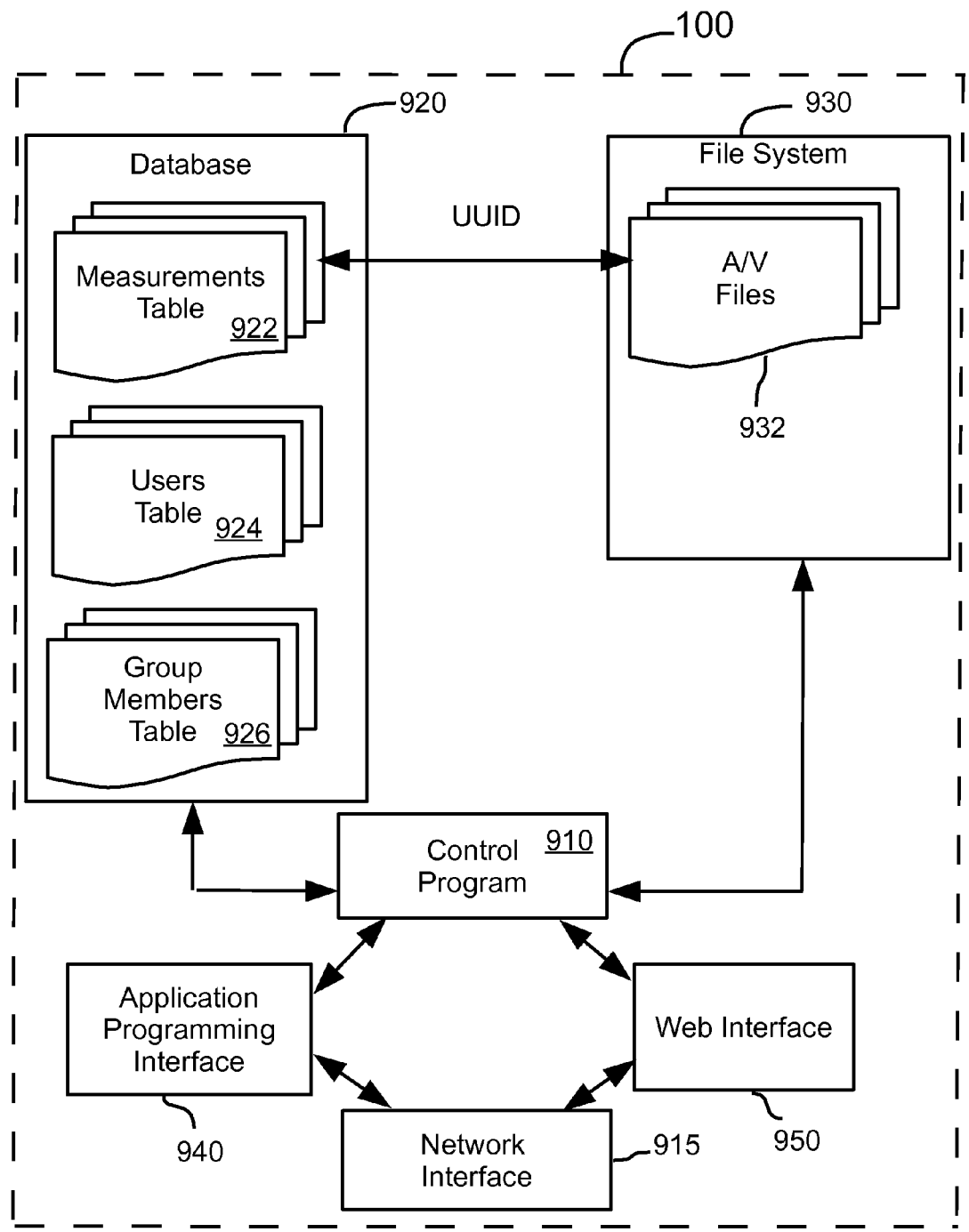
FIG. 9 shows a block diagram of the server computer architecture according to an embodiment of the invention.

Referring to FIG. 9, the server computer 100 comprises a processor and a memory having computer readable instructions stored thereon for execution by the processor, forming the following modules: control program module 910, network interface module 915, database module 920 and file system module 930. Access to the control program module 910 may be through an application programming interface module 940 or a web interface module 950 or both. The database module 920 may be a structured query language module (SQL) database or any other relational database. It may be on the same computing system as the server computer 100 or may be separate and connected by a system connection. The database module 920 comprises at least a measurements table module 922 into which the measurement records acquired from the portable instruments 105 are stored. The measurements table module 922 holds fields such as for time, date and measured values and optionally fields for coordinates, user identification, scanned codes, user text, serial numbers of the equipment used in taking the measurement and the like. In one embodiment of the invention, the database module 920 also comprises a user table module 924 that contains one folder for every user authorized to access the server computer 100. Each such folder comprises fields for user identifier, user name and password. It will be apparent that the passwords stored in the user's table module 924 should be encrypted in accordance with security standards in effect at the time the server computer 100 is deployed. Each measurement record in the measurements table module 922 will have a pointer to one folder in the user's table module 924. Thus, a database query may be used to identify the user for a particular pre-recorded data or to identify all the pre-recorded data created by a single user. In one embodiment of the invention, the database module 920 also comprises a group member's table module 926. The group member's table module 926 has a multiple relationship network with the users table module 924, such as in that every user may belong to any number of groups and every group may have any number of users. Optionally, a group description table module (not shown) may contain folders for each group, providing fields for the group name, description and rules for membership. Where a group table module 926 exists, each pre-recorded data includes a folder indicating the corresponding group module and these memberships are used to determine the available folders to each user for retrieval. In one embodiment of the invention, a group may be identified as a public group, indicating that pre-recorded data assigned to that group are accessible to any user. The control program module 910 may be a web server application or other program capable of responding to requests received through the system interface module 915 and accessing the database module 920 and file system module 930 to respond to those requests. Upon receiving a request to store a measurement record sent by the transmit record module 630, the control program module 910 determines if the current user is authorized, by instructing the database module 920 to look up the users table module 924 and confirm that the requesting user is listed in the database module 920 with a corresponding password. Having identified and authorized the user, the control program module 910 instructs the database module 920 to create a new record in the measurements table module 922. This record will have as identifier the UUID that was generated by the hand-held computer 110 executing generate UUID module 530. If the measurement received includes audio/visual (A/V) files, the control program module 910 stores those files in A/V files module 932 in the server's file system module 930, identifying those files by the measurement record UUID. This A/V files module 932 may accommodate digital photos, audio records, video records or other files digitally representing observations made with the pre-recorded data. Upon receiving a request to identify available pre-recorded data by the inquire available module 740 on the hand-held computer 110, the control program module 910 directs the database module 920 to report the number of pre-recorded data available to the current user, by date range, coordinates, group or other supplied parameters. The control program module 910 returns the numbers of available pre-recorded data to the hand-held computer 110. Upon receiving a request to retrieve a pre-recorded data from the receive & store module 750 on the hand-held computer 110, the control program module 910 queries the database module 920 for the identified record and transmits the record to the hand-held computer module 110. The control program module 910 then examines the file system module 930 to determine if there is any A/V files module 932 with a UUID that matches the measurement record. The control program module 910 informs the hand-held computer 110 of the availability, type and sizes of these files. The receive & store module 750 decides whether or not to download the A/V files module 932 based on their sizes, current connection bandwidth and cost and user settings. In the case where the hand-held computer 110 does not retrieve all supporting files, a note is made in the local storage of the hand-held computer 110 so that the A/V files module 932 can be retrieved when a higher bandwidth and/or lower cost connection is available. The web interface module 950 helps the users to interact with the server computer 100 over a system using a web browser or other web access program. The inclusion of a web interface module 950 provides users the means to review the pre-recorded data without the requirement of the hand-held computer 110.

Figure 10:
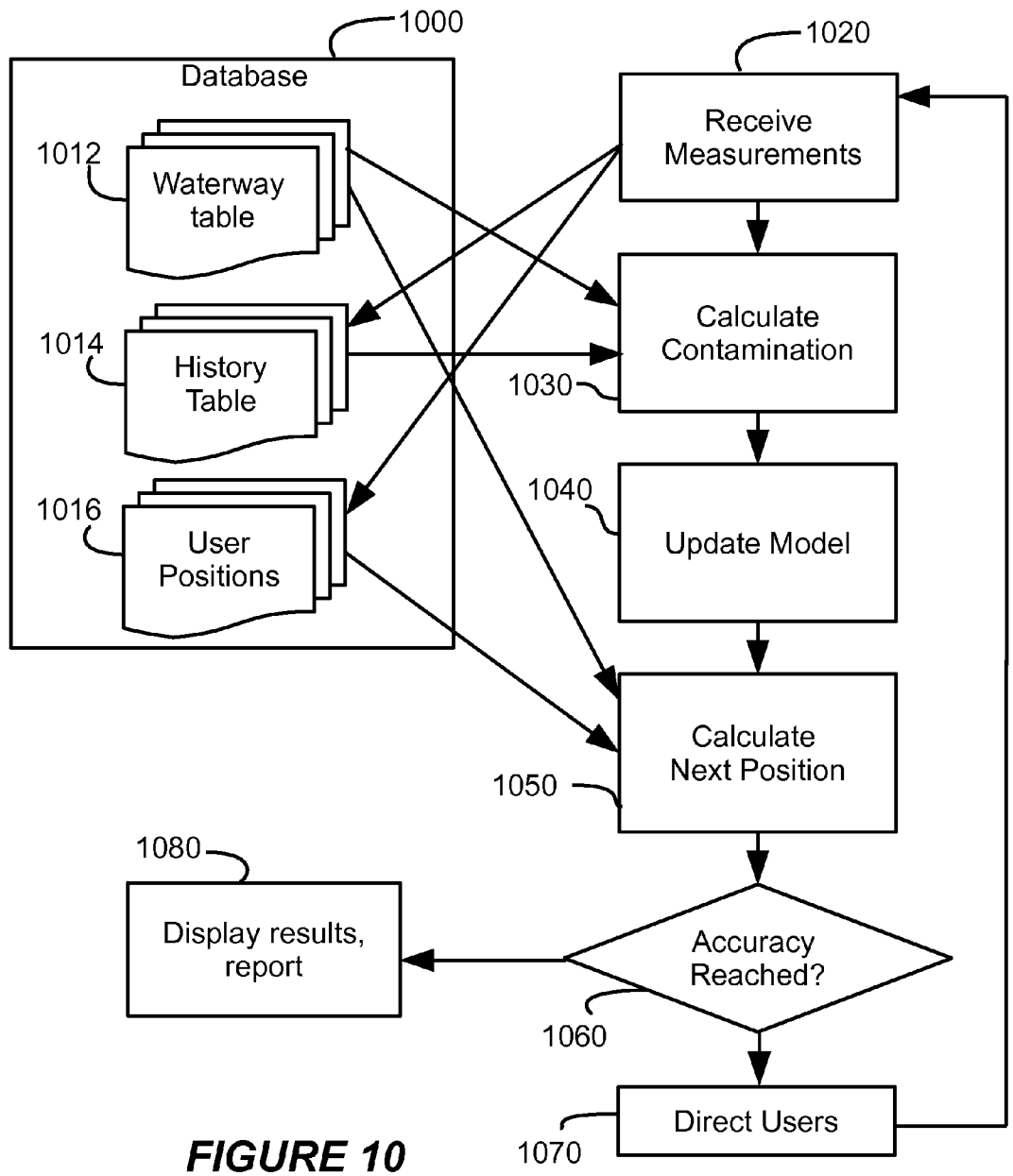
FIG. 10 shows a block diagram illustrating an embodiment of the invention for optimizing measurement locations for portable instrumentation.

FIG. 10 shows a block diagram illustrating an embodiment of the invention for optimizing measurement locations for portable instrumentation, for example, identifying the location of contaminant. When a user or group of users are testing a body of water to detect the presence of contaminants, each measurement is analyzed and compared to previous measurements, to determine the probability that the contaminant is influencing the value of the measurement. These calculations are made in the calculate contamination module 1030 in the server computer 100. Alternatively the calculations can be distributed through a collection of one or more hand-held computers 110, operating in parallel to perform the calculations. Each time a new measurement is received at receive measurements module 1020, the identity of the body of the water in which the test was taken is identified by looking up the user's geographic coordinates in the waterway table module 1012 and then a comparison is made against the history table module 1014. The current location of each contributing user is tracked by updating a record in a user position table module 1016. The waterway table module 1012, the history table module 1014 and the user positions table module 1016 are stored in a database 1000 in a memory. The model used for the calculation is updated with the current calculation, as shown by the update model module 1040. The measurements obtained by the hand-held computer 110 include electrochemical measurements such as pH or conductivity, color information and the like as collected by the integrated camera on the hand-held computer 110 and/or user observations entered through the hand-held computer 110. The calculate contamination module 1030 takes the recorded measurements at the receive measurements module 1020 and analyzes the variance based on past results contained in the history table module 1014. Since the recent measurements may not be at a location previously measured, an extrapolation from the nearby points is used to determine the normal range of values at this point. The measurements taken may be of a body of liquid or soil measurements in the ground or any other investigative site. This update model module 1040 is also used to generate other types of concentration maps. For example, the model produced may be used to control the application of fertilizers or other chemicals to fields where crops would be grown. It can also be used to assess the risks and extent of chemical spills on the ground and the generated concentration map can be used to control the distribution of neutralizing chemicals.

In a simplified example, two measurement locations are considered: A and B, where a positive coefficient of correlation between the values measured at A and B exists. In order to know the expected value at a third point: P somewhere between A and B where no measurement has been previously taken.

The estimated value is calculated by linear interpolation between A and B. For example:

$$P(\text{estimated}) = [C_A * \text{distance}(B,P) + C_B * \text{distance}(A,P)] / [\text{distance}(A,P) + \text{distance}(B,P)],$$

$C_A$ being the concentration of the contaminant at point A, and $C_B$ being the concentration of the contaminant at point B.

The P(correlation) certainty value is calculated by first calculating the coefficient of correlation, corr(A,B), between values taken at points A and B, using the data from the history table module 1014. P(correlation) indicates the likelihood that our P(estimate) is correct.

$$P(\text{correlation}) = [\text{corr}(A,B) * \text{distance}(A,B)] / [\{\text{distance}(A,P) + \text{distance}(B,P)\}/2]$$

Any number of points may be included in these calculations.

The update model module 1040 uses the contamination calculations to build a matrix model of the body of water being tested. Consulting the waterway table 1012 to obtain the geography of the body, a model is generated by dividing the body of water into N number of sections of approximately equal volume. The number of sections, N, is chosen based on the level of precision needed. For example in a simple case, the body of water is a square and all points are known to correlate with each other from previous measurements. The body has been divided into 16 sections. Three measurements are taken at points A, B and C and compared with the expected measurements at those points. The results show that A is 4 standard deviations from the average, B is 2 and C is 3. These values are arranged in a matrix, having 3 known points and 13 unknown. The unknown points are filled with the value 1, indicating that they are all equally likely to contain the source of contamination.

```
A  1  1  B                                          Step 1
1  1  1  1
1  1  1  1
C  1  1  1

A = 4, B = 2, C = 3
```

Since the contamination signal is higher at A than at B or C, the method excludes all points that are not closer to A than B or C by reducing the probability by the historic coefficient of correlation between the known points and the points in question. In an example, all points are known to correlate with each other, thus the probabilities are reduced to zero.

```
A  1  0  B                                          Step 2
1  1  0  0
0  0  0  0
C  0  0  0

A = 4, B = 2, C = 3
```

Three unknown sections remain that could contain the source of the contamination. The next step excludes all points that are not closer to C than to B, as the contamination signals indicate a higher value at C than B.

```
A  0  0  B                                          Step 3
1  0  0  0
0  0  0  0
C  0  0  0

A = 4, B = 2, C = 3
```

As there is one remaining point which has a much higher probability than any other point, this is considered to be the most likely source.

The calculate next position module 1050 is used to calculate the next best position to measure, if the preceding step left more than one possibility. The calculation of the next position is made by examining the model as described and generating a list of the points which would remove the most uncertainty from the greatest volume of water. In the preceding example, the unknown point with probability 1 would remove the uncertainty and determine if the source is at point A or the point directly below. Next, points are eliminated from the list based on accessibility. For land based testers, the points that are not on the perimeter of the body of water are eliminated. For each point where a measurement is still on the list of target points, the time to reach is calculated based on each user's current position and their rate of travel. The calculate next position module 1050 is then run again, using the model with the selected target points already filled with simulated values, to calculate the likely measurement positions for the following iteration. This process may be repeated to predict any number of steps, based on the computing power of the server computer 100 or hand-held computer 110 making the calculations. The sequences of measuring points are examined and sorted, preference being given to those paths that provide the greatest change in overall model certainty in the least amount of travel time. Additional penalties may be applied to certain paths, for example, paths in which a user reverses direction. Some paths may also be given preferences, for example adding to the score of paths that bring all users back to their starting points when the analysis is complete. This calculation is made by a best path routing algorithm (not shown), such as is used in a navigation system. In some embodiments, the path routing algorithms will be provided as a built-in component of the operating system of the hand-held computer 110. Having solved the problem of the next positions to take measurements, a comparison is made in the accuracy reached module 1060. The improvement in the expected overall model accuracy by taking the current measurements is examined and a decision is made on whether or not to continue. The decision may be made by the users through the statistics presented or may be automatically based on a set of conditions defined by the needs of the analysis. The direct user's module 1070 sends the target point coordinates to the hand-held computer 110 of each user. The hand-held computer 110 then displays to the user a direction and distance value, guiding the user to the next measurement point. Based on the capabilities of the hand-held computer 110, this may be presented as a path on a map. When the desired level of accuracy and certainty has been reached, the display results report module 1080 presents the collected data to the users. The presentation may be a simple table of values, a graphical display or other format as appropriate. The results may also be used to generate a report, which can be sent from the hand-held computer 110 or the server computer 100 to other users as needed. The display results module 1080 may also be used to display the ongoing partial results to the users while the measurements are being taken, along with feedback on the level of completion of the analysis.

Figure 11:
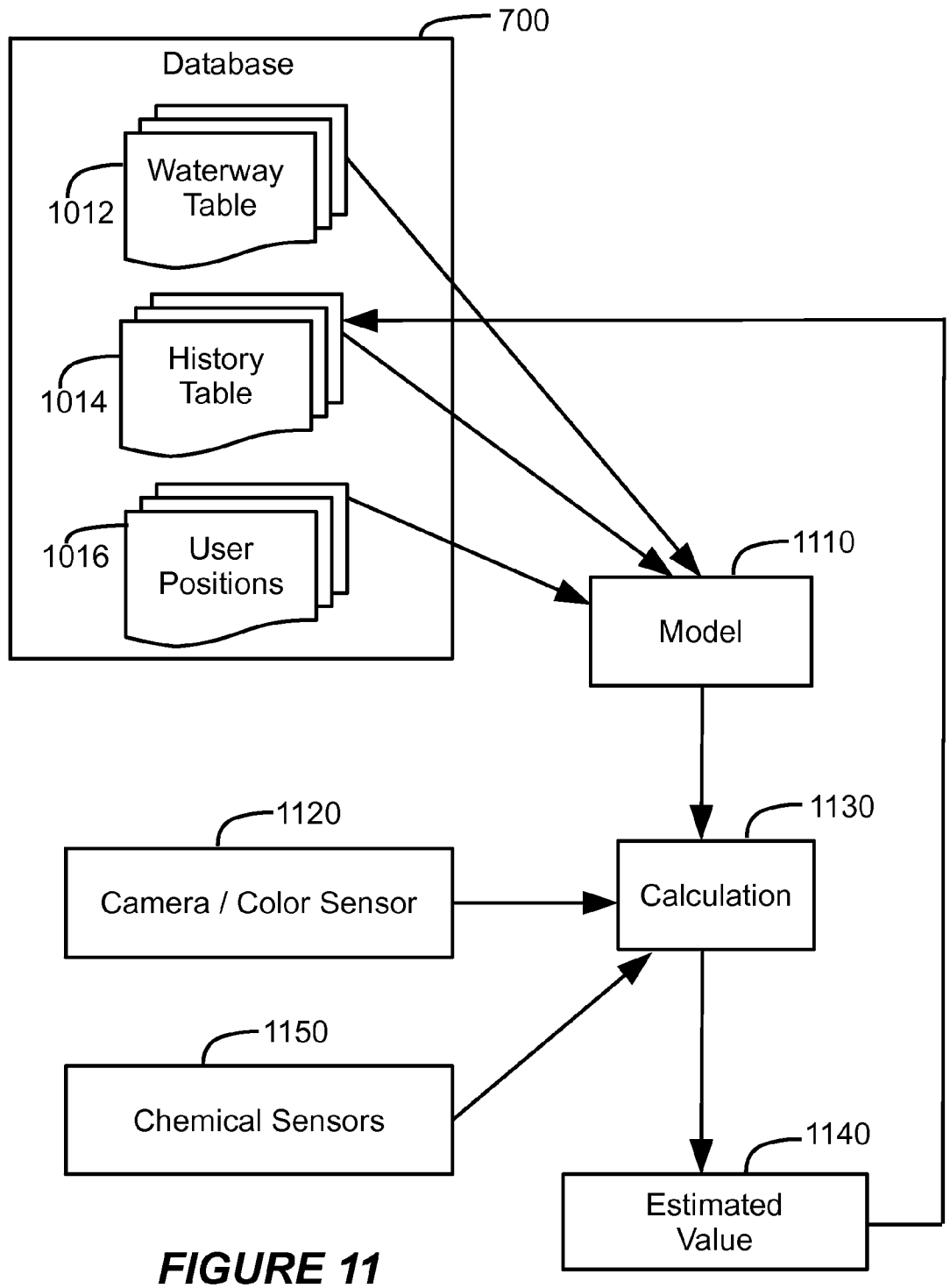
FIG. 11 shows a diagram illustrating an embodiment of the invention for inferring measurements from incomplete signals.

FIG. 11 shows a diagram illustrating an embodiment of the invention for inferring measurements from incomplete signals, for example, for inferring a property of water in the absence of a sensor to measure that property is shown. The system 10 in real-time may also infer measurements from incomplete signals. For example, certain signals received from the hand-held computer 110 may be used to infer a property of water or liquid in the absence of a sensor to measure that particular property. Such inference may be drawn by modeling and computing with the relevant pre-recorded data. As shown, the portable instrument 105 is equipped with a camera/color sensor module 1120, used to examine the color of the water. The camera may be integrated into the hand-held computer 110 as in the case of a smart-phone or may be an external device. A sample of the water may be collected in a clear bottle and the camera is used to take a digital photograph. By using a standard volume of water, and a background of known color, the accuracy of the color analysis is greatly improved. A further improvement in accuracy is obtained if the bottle containing the water is first photographed empty and then only the difference in color after filling with water is considered. Even greater color accuracy is achieved when the light source used to illuminate the water sample is of a known color. A model module 1110 is created based on the user's current position and the history of correlations between color and properties of the water for that particular body of water. The model module 1110 also takes into account the color as measured by the camera, values of any recent measurements taken in the vicinity and environmental parameters such as temperature, pressure and humidity as measured by the hand-held computer 110. Where the pre-recorded data in the history table 1014 spans over more than one year, a seasonal correction factor may also be applied to the model module 1110.

Below is an exemplary simplified calculation:

$$Output=(R*Cr+G*Cg+B*Cb+S1*Cs1+S2*Cs2\ldots)*(1-P)+M*P+S$$

where

R, G, and B are the relative intensities of the Red, Green and Blue signals from the camera, Cr, Cg and Cb are the coefficients calculated by regression analysis of the history table 1014, S1, S2 are the signals from environmental sensors, Cs1, Cs2 are the coefficients for the environmental sensors calculated by linear regression, P is the probability factor, calculated as shown below, M is the previous measurement value, and S is a seasonal correction value, calculated below.

To calculate P, the distance D in meters and the time T in hours since the previous measurement may be used:

$$P=1/[(D^2*Wd)*(T^2*Wt)]$$

The weighting factors Wd and Wt are determined by calculating the differences from each other in previous measurements as available in the history table module 1014 and then performing a linear regression to determine the coefficients for the distance squared and the time squared on the differences.

Where a seasonal correction value S is used, it is calculated as follows:

$$S=\sin[(DoY-1)/(DiY)*pi]*SF$$

Where DoY is the day of the year, starting at 1 for the 1st of January,

DiY is the number of days in the current year, either 365 or 366, pi is the mathematical constant (3.1415 . . . ), and SF is the seasonal factor, calculated by linear regression on the history table module 1014.

The coefficients from the model module 1110 and the color information collected from the camera/color sensor module 1120 are fed to the calculation module 1130. The output from the calculation module 1130 is an estimated value as shown by the estimated value module 1140, which predicts a property of the body of water being tested. The estimated value from the estimated value module 1140 is written into the history table module 1014 for later comparison with known values when the water in the vicinity is tested by an appropriate sensor. The difference between the estimated value in the estimated value module 1140 and the current value are used to improve the accuracy of the model in the model module 1110 generated for future samples. The overall accuracy of the estimated values can be improved by having one or more chemical sensors as shown by the chemical sensors module 1150 included in the calculation, even though these chemical sensors as shown by the chemical sensors module 1150 are not measuring the intended property of the water.

For example, the user may be equipped with a pH sensor but the desired output is a conductivity value. In the case where a sensor of a different type is available, the model module 1110 is built taking into account not only the correlations to color but also the signals from the attached chemical sensors module 1150. In the case where the signals from the chemical sensors module 1150 are used, they take the place of the environmental sensor values for S in the above equations.

The foregoing has constituted a description of specific embodiments showing how the invention may be applied and put into use. These embodiments are only exemplary. The invention in its broadest, and more specific aspects, is further described and defined in the claims which now follow. These claims, and the language used therein, are to be understood in terms of the variants of the invention which have been described. They are not to be restricted to such variants, but are to be read as covering the full scope of the invention as is implicit within the invention and the disclosure that has been provided herein.

What is claimed is:

1. A system for portable instrumentation, comprising:
    a server computer;
    a portable instrument wirelessly connectable to the server computer, the portable instrument comprising:
        one or more sensors for performing respective physical or electrochemical measurements; and
        a hand-held computer operably connectable to the sensors and configured to:
        (i) record the measurements and transmit the measurements to the server computer;
        (ii) evaluate a real-time wireless connection quality between the portable instrument and the server computer;
        (iii) provided the wireless connection quality shows a declining trend:
        (iii-1) determine a spatial boundary where the portable instrument reaches a dead zone with wireless connection quality below a predetermined threshold; and
        (iii-2) request pre-recorded data, stored on the server computer and related to the measurements, to be forwarded to the portable instrument from the server computer before the portable instrument reaches the spatial boundary.

2. The system of claim 1, wherein the hand-held computer is further configured to predict a location where a measurement in the dead-zone beyond the spatial boundary is going to be performed, and request the server computer to forward the pre-recorded data related to said location before the portable instrument reaches the dead-zone.

3. The system of claim 1, wherein the hand-held computer is further configured to determine the wireless connection quality as a function of a signal strength at the portable instrument and a signal round trip time between the portable instrument and the server computer.

4. The system of claim 1, wherein the hand-held computer is further configured to determine a derivate of the wireless connection quality over distance to determine the spatial boundary.

5. The system of claim 1, wherein the hand-held computer is further configured to:
    determine how much time it is going to take before the portable instrument reaches the spatial boundary; and
    determine an amount of data to be sent to the portable instrument within said time, taking into account declining wireless connection quality.

6. The system of claim 1, wherein the predetermined threshold is selected so that to allow the portable instrument to receive a predetermined amount of data from the server computer.

7. The system of claim 1, wherein the pre-recorded data is prioritized based on at least one from the following criteria:
    cost for data transmission;
    amount of data capable to be forwarded to the portable instrument over a wireless connection of declining quality;
    a memory size on the hand-held computer;
    time stamps of data to be forwarded, with more recent data being given higher priority; and
    relevance of said pre-recorded data to the measurements.

8. The system of claim 1, wherein the hand-held computer is further configured to generate an alert message if the measurements are outside of a range for pre-recorded data.

9. The system of claim 1, further comprising another portable instrument comprising another hand-held computer, wherein one of the hand-held computer and the another hand-held computer is configured to operate as a server computer when the server computer is unavailable.

10. The system of claim 1, wherein the measurements comprise at least one of:
    global positioning system (GPS) measurement;
    compass measurement;
    temperature measurement;
    pH measurement;
    conductivity measurement;
    oxidation-reduction potential (ORP) measurement;
    video recording; and
    audio recording.

11. The system of claim 1, wherein the pre-recorded data is one ore more of the following:
    audio, video, text, and multimedia.

12. A portable instrument, wirelessly connectable to a server computer, the portable instrument comprising:
    one or more sensors for performing respective physical or electrochemical measurements; and
    a hand-held computer operably connectable to the sensors and configured to:
    (i) record the measurements and transmit the measurements to the server computer; and
    (ii) evaluate a real-time wireless connection quality between the portable instrument and the server computer;
    (iii) provided the wireless connection quality shows a declining trend:
    (iii-1) determine a spatial boundary where the portable instrument reaches a dead zone with wireless connection quality below a predetermined threshold; and
    (iii-2) request pre-recorded data, stored on the server computer and related to the measurements, to be forwarded to the portable instrument from the server computer before the portable instrument reaches the spatial boundary.

13. The portable instrument of claim 12, wherein the hand-held computer is further configured to predict a location where a measurement in the dead-zone beyond the spatial boundary is going to be performed, and request the server computer to forward the pre-recorded data related to said location before the portable instrument reaches the dead-zone.

14. A method for portable instrumentation performed by a portable instrument wirelessly connectable to a server computer, and having one or more sensors for performing physical or electrochemical measurements and a hand-held computer operably connectable to the sensors, the method comprising:
  (i) recording the measurements and transmitting the measurements to the server computer;
  (ii) evaluating a real-time wireless connection quality between the portable instrument and the server computer;
  (iii) provided the wireless connection quality shows a declining trend:
  (iii-1) determining a spatial boundary where the portable instrument reaches a dead zone with wireless connection quality below a predetermined threshold; and
  (iii-2) requesting pre-recorded data, stored on the server computer and related to the measurements, to be forwarded to the portable instrument from the server computer before the portable instrument reaches the spatial boundary.

15. The method of claim 14, further comprising predicting a location where a measurement in the dead-zone beyond the spatial boundary is going to be performed, and requesting the server computer to forward the pre-recorded data related to said location before the portable instrument reaches the spatial boundary.

16. The method of claim 14, wherein:
  the step (ii) comprises determining the wireless connection quality as a function of a signal strength at the portable instrument and a signal round trip time between the portable instrument and the server computer; and
  the step (iii-1) comprises determining a derivate of the wireless connection quality over distance to determine the spatial boundary.

17. The method of claim 14, further comprising:
  determining how much time it is going to take before the portable instrument reaches the spatial boundary; and
  determining an amount of data to be sent to the portable instrument within said time, taking into account declining wireless connection quality.

18. The method of claim 14, further comprising determining the predetermined threshold so as to allow the portable instrument to receive a predetermined amount of data from the server computer.

19. The method of claim 14, further comprising prioritizing the pre-recorded data based on at least one from the following criteria:
  cost for data transmission;
  amount of data capable to be transmitted to the portable instrument over a wireless connection of declining quality;
  a memory size on the hand-held computer;
  time stamps of data to be transmitted, with more recent data being given higher priority; and
  relevance of said pre-recorded data to the measurements.

20. The method of claim 14, wherein the measurements comprise at least one of:
  global positioning system (GPS) measurement;
  compass measurement;
  temperature measurement;
  pH measurement;
  conductivity measurement;
  oxidation-reduction potential (ORP) measurement;
  video recording;
  audio recording;
  and
  the pre-recorded data is one or more of the following: audio; video; text; multimedia.

* * * * *